United States Patent [19]

Hertzer et al.

[11] Patent Number: 5,059,365

[45] Date of Patent: Oct. 22, 1991

[54] METHOD OF SETTING AND MAINTAINING A DESIRED MOLD CLAMPING FORCE

[75] Inventors: Ronald A. Hertzer; Jeffrey A. Chappell, both of Milford, Ohio

[73] Assignee: Cincinnati Milacron Inc., Cincinnati, Ohio

[21] Appl. No.: 524,312

[22] Filed: May 17, 1990

[51] Int. Cl.⁵ .................................................. B29C 33/22
[52] U.S. Cl. ............................. 264/40.5; 425/150; 425/167; 425/171; 425/593; 425/451.6
[58] Field of Search ............... 264/40.1, 40.5, 328.1; 425/135, 149, 150, 167, 170, 171, 589, 592, 593, 451.5, 451.6

[56] References Cited

U.S. PATENT DOCUMENTS

| | | | |
|---|---|---|---|
| 3,579,741 | 5/1971 | Schwartz . | |
| 3,642,405 | 2/1972 | Eggenberger et al. | 425/149 |
| 3,819,774 | 5/1969 | Eggenberger et al. . | |
| 4,281,977 | 8/1981 | Farrell | 425/149 |
| 4,297,901 | 11/1981 | Stroup et al. | 73/862.53 |
| 4,301,100 | 11/1981 | Farrell | 264/40.5 |
| 4,345,890 | 8/1982 | Hemmi et al. | 425/143 |
| 4,588,364 | 5/1986 | Schad | 425/135 |
| 4,594,065 | 6/1986 | Langlois et al. | 425/150 |
| 4,645,443 | 2/1987 | Aoki | 425/150 |
| 4,685,876 | 8/1987 | Loscei | 425/170 |
| 4,710,119 | 12/1987 | Otake | 425/136 |
| 4,726,920 | 2/1988 | Yokota | 264/40.5 |
| 4,828,474 | 5/1989 | Ballantyne | 425/150 |
| 4,832,884 | 5/1989 | Speck et al. | 264/40.5 |
| 4,846,654 | 7/1989 | Neko | 425/150 |

FOREIGN PATENT DOCUMENTS

| | | | |
|---|---|---|---|
| 62-32020 | 2/1987 | Japan | 425/593 |
| 1443187 | 7/1976 | United Kingdom | 425/150 |

Primary Examiner—Jill L. Heitbrink
Attorney, Agent, or Firm—Nies, Kurz, Bergert & Tamburro

[57] ABSTRACT

A method and apparatus for automatically setting the die height platen on a toggle-operated injection molding machine to achieve a desired mold clamping force. A control is provided and contains information relating a desired clamp tonnage with a toggle crosshead displacement, in order to permit setting the die height platen for a particular set of molds so that the clamp, when operated, will automatically provide the desired clamping force between the mold members. The adjustment is provided by moving the die height platen in response to deviations from a predetermined set of conditions, the die height platen being moved by an hydraulic motor and chain drive to shift the die height platen along guide rods that extend between the die height platen and a stationary mold platen.

9 Claims, 5 Drawing Sheets

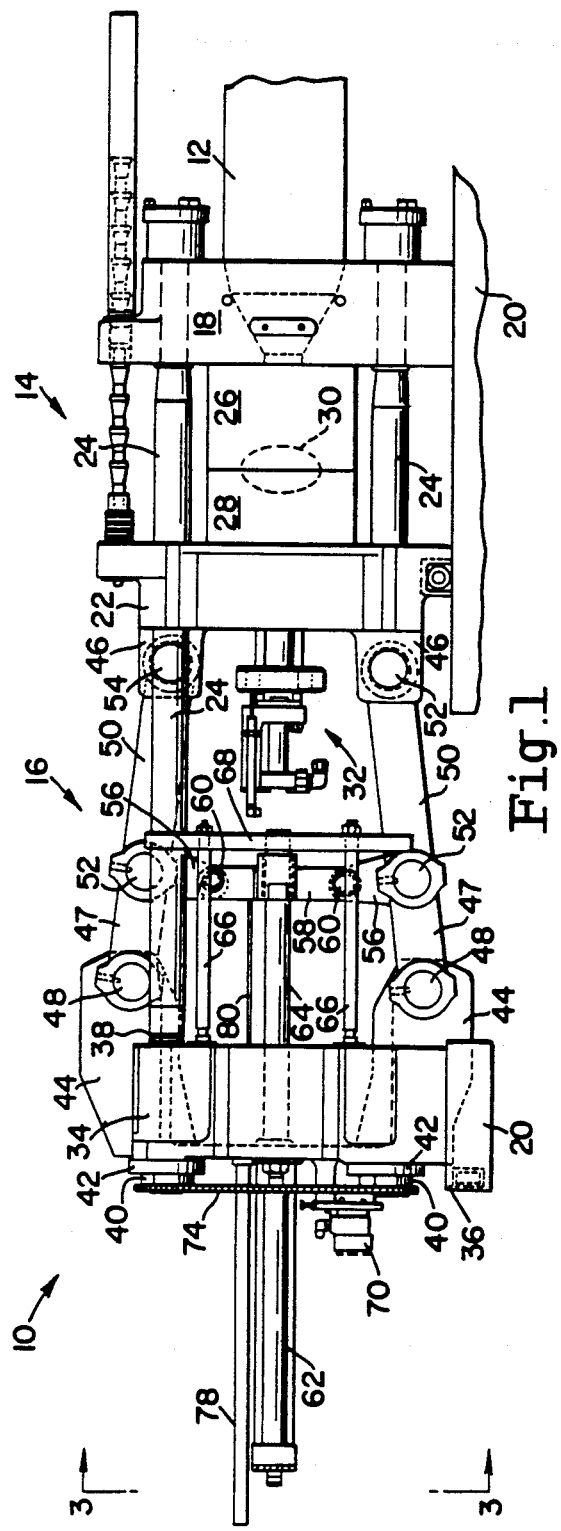
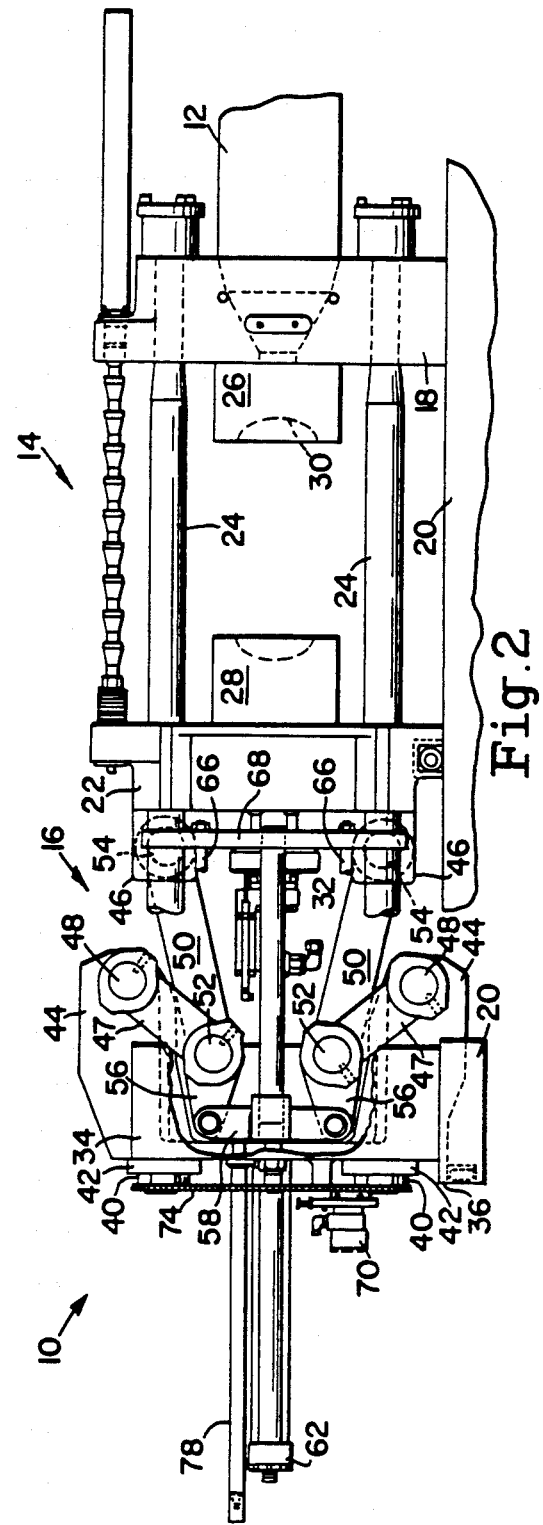

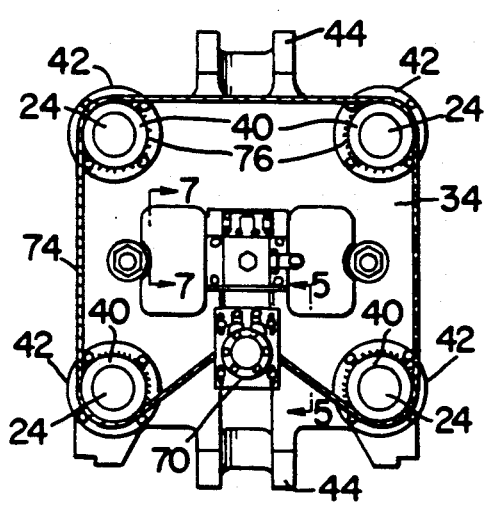 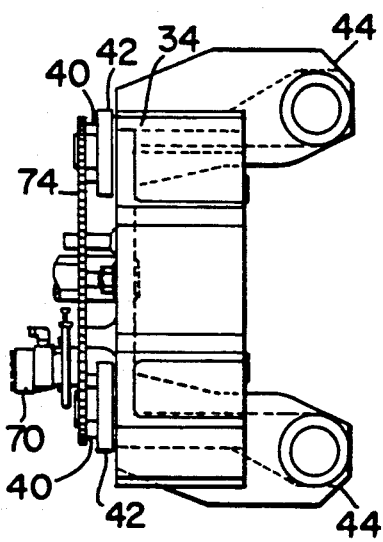
Fig.3  Fig.4
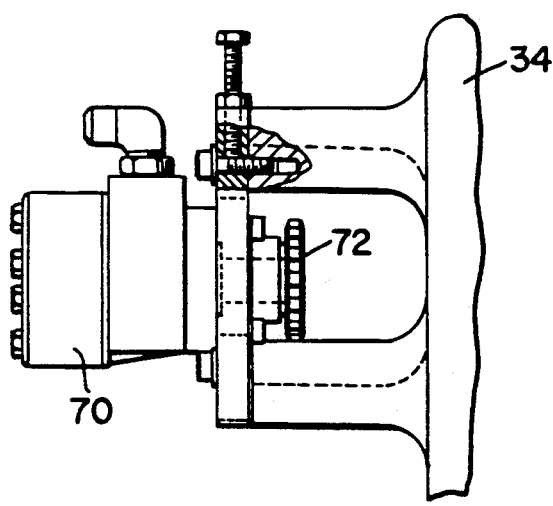 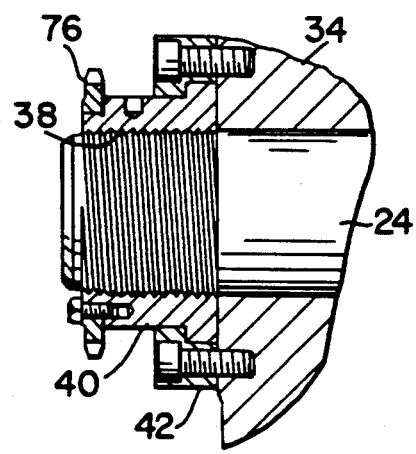
Fig.5  Fig.6
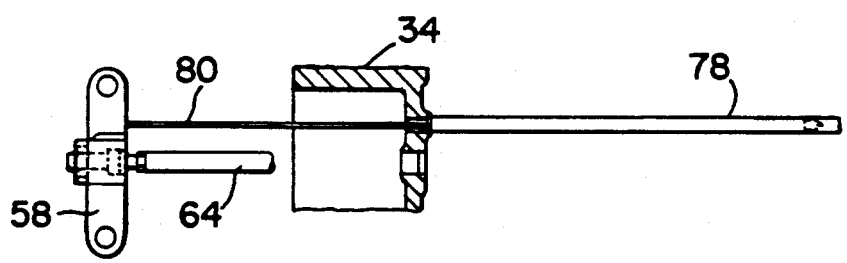
Fig.7

METHOD OF SETTING AND MAINTAINING A DESIRED MOLD CLAMPING FORCE

BACKGROUND OF THE INVENTION

1. Field of the Invention

The present invention relates to a method of and apparatus for setting and maintaining a desired holding force between a pair of relatively movable members that are adapted to be brought into and out of contact with each other and while in contact are held together with a predetermined holding force. More particularly, the present invention relates to the structure and operation of a mold clamping system in a plastics injection molding machine, to permit automatic setting of the parts of a mold clamping system to provide a desired mold clamping force, and, additionally, to periodically check the positions of parts of the clamping system after a predetermined number of clamp operating cycles to determine whether readjustment of the positions of parts is necessary to maintain a desired mold clamping force.

2. Description of the Related Art

Various types of mold clamping arrangements have been developed to hold a pair of mold members together while molten plastics materials are injected into a mold cavity defined by the closed mold members. Because of the high injection pressures employed to inject molten plastic material into a mold cavity, of the order of thousands of pounds per square inch, a high mold clamping force is normally required, on the order of several hundred tons or greater, in order to resist the force resulting from the internal pressure within the mold from forcing the mold members apart, which could result in a thin, external tab or protrusion of plastic material on the molded article, commonly referred to as "flash," or in incomplete filling of the mold cavity as a result of excessive separation of the mold members during injection. In either case, the resulting molded part is unacceptable.

Although it would be possible to avoid the mold separation problem by consistently imposing a very high mold clamping force to hold a pair of molds together, regardless of the injection pressure of the plastic material, repeated operation with unnecessarily high clamping loads could result in damage to the molds and is therefore undesirable. Accordingly, the externally applied mold clamping force should bear some close relationship with the actual internal mold separation force generated within the mold cavity, and therefore close control over the mold clamping force is highly desirable.

A method and apparatus for controlling the mold clamping force imposed upon the molds in an injection molding machine were disclosed by Ulrich Eggenberger et al. in U.S. Pat. No. 3,642,405, which issued on Feb. 15, 1972, and in U.S. Pat. No. 3,819,774, which issued on June 25, 1974. Those patents show an injection molding machine having a toggle-type mold clamping arrangement wherein the normally stationary clamp support platen that supports the toggle clamping system is selectively movable toward or away from the stationary mold platen that supports one of the mold members, in order to attempt to maintain a predetermined constant mold clamping force between the mold members over a number of machine operating cycles. The position of the clamp platen is adjusted relative to the stationary mold platen to adjust for thermal expansion and other effects and to maintain the desired mold clamping force.

Another arrangement for maintaining a predetermined desired mold clamping force is disclosed in U.S. Pat. No. 4,281,977, which issued on Aug. 4, 1981, to Robert E. Farrell, and in U.S. Pat. No. 4,301,100, which issued on Nov. 17, 1981, also to Robert E. Farrell. Although directed to achieving a similar result as in the Eggenberger et al. patents referred to above, the Farrell patents disclose a system in which the adjustment to maintain a desired clamping force is effected by adjusting the length of the tie rods by means of a high ratio mechanical drive, and by utilizing a displacement sensor that is connected with the high ratio mechanical drive to effect any necessary adjustment to maintain the desired mold clamping force as the machine operates through a predetermined number of operating cycles.

Another patent that discloses an arrangement for maintaining a predetermined mold clamping force in an injection molding machine that includes a toggle-type mold clamping system is U.S. Pat. No. 4,832,884, which issued May 23, 1989, to Ruedi Speck et al. That patent also incorporates a drive arrangement for moving a normally stationary clamp platen relative to a stationary mold platen, but it also senses mold clamping force by providing strain gauges on each toggle lever to measure the compressive stresses generated in the toggle levers during operation of the mold clamping system. Those forces are averaged and the averages are monitored over several operating cycles. When the sensed forces exceed a predetermined tolerance from a base value, an adjustment is made to adjust the mold spacing as necessary to maintain the desired mold clamping force value.

Although methods and apparatus have been suggested for maintaining a predetermined mold clamping force in an injection molding machine, as reflected in the above-identified patents, none of those patents teaches an arrangement for initially automatically setting the mold clamping system to produce a desired mold clamping force by initially setting up the spacing of the molds and the parts of the mold clamping system to achieve a desired mold clamping force.

It is an object of the present invention to overcome the limitations of the prior art devices and to provide an automatic setup arrangement to provide a mold spacing and mold clamp operation that will result in the mold desired clamping force without the need for manual setting of the respective parts.

It is another object of the present invention to provide a mold clamping control arrangement whereby after an initial setting of the parts of the mold clamping system machine has been established to obtain a desired mold clamping force, the clamping system is monitored during subsequent operating cycles, and changes are made to the relative positions of the parts to maintain the desired mold clamping force.

It is a still further object of the present invention to provide a mold clamping system that is fully automatic in setup and operation and that does not require the intervention of an human operator.

SUMMARY OF THE INVENTION

Briefly stated, in accordance with one aspect of the present invention, a method and apparatus are provided for setting a predetermined clamping force between a pair of cooperable mold members that are adapted to be moved relative to each other by a mold clamping mechanism. The settings of the mold clamping mechanism are based upon the mold height corresponding with the installed molds, and also upon the desired mold clamping force. After the mold installation has been completed, a control device determines a required crosshead position for the toggle crosshead, which is the position at which the molds will be clamped together at the desired clamping force when the toggle links are fully extended. At any time when the method is executed the molds are moved together and a predetermined pressure is applied to the clamp closing mechanism. The position of the toggle crosshead is compared with the required crosshead position, and if there is a difference, the clamp is opened to the required crosshead position. Using a die height adjustment arrangement for moving a die height platen, the clamp mechanism and die height platen are moved in a direction to reduce the difference to zero. The clamp is again closed with the predetermined pressure and the crosshead position is compared with the required crosshead position. The process is repeated until the crosshead is positioned at the required crosshead position. Thereafter, operation of the clamping mechanism to the fully extended position of the toggle links will result in the desired clamping force.

BRIEF DESCRIPTION OF THE DRAWINGS

FIG. 1 is a side elevational view of one form of a toggle-type injection molding machine in accordance with the present invention showing the toggle crosshead and toggle links in their fully extended positions.

FIG. 2 is a side elevational view similar to that of FIG. 1, but showing the relative positions of the parts of the toggle system when the toggle crosshead and toggle links are in their fully retracted positions.

FIG. 3 is an end view of the machine shown in FIG. 1, taken along the line 3—3 thereof.

FIG. 4 is a side view of the toggle support platen.

FIG. 5 is an enlarged, fragmentary view of a toggle support platen adjusting motor, taken along the line 5—5 of FIG. 3.

FIG. 6 is an enlarged, fragmentary, cross-sectional view through an adjusting nut for adjusting the position of the toggle support platen along the machine tie rods.

FIG. 7 is a fragmentary side view showing the position and interconnection between a linear displacement measuring device supported on the toggle support platen and connected with the toggle crosshead, taken along the line 7—7 of FIG. 3.

DESCRIPTION OF THE PREFERRED EMBODIMENTS

Figure 8A:
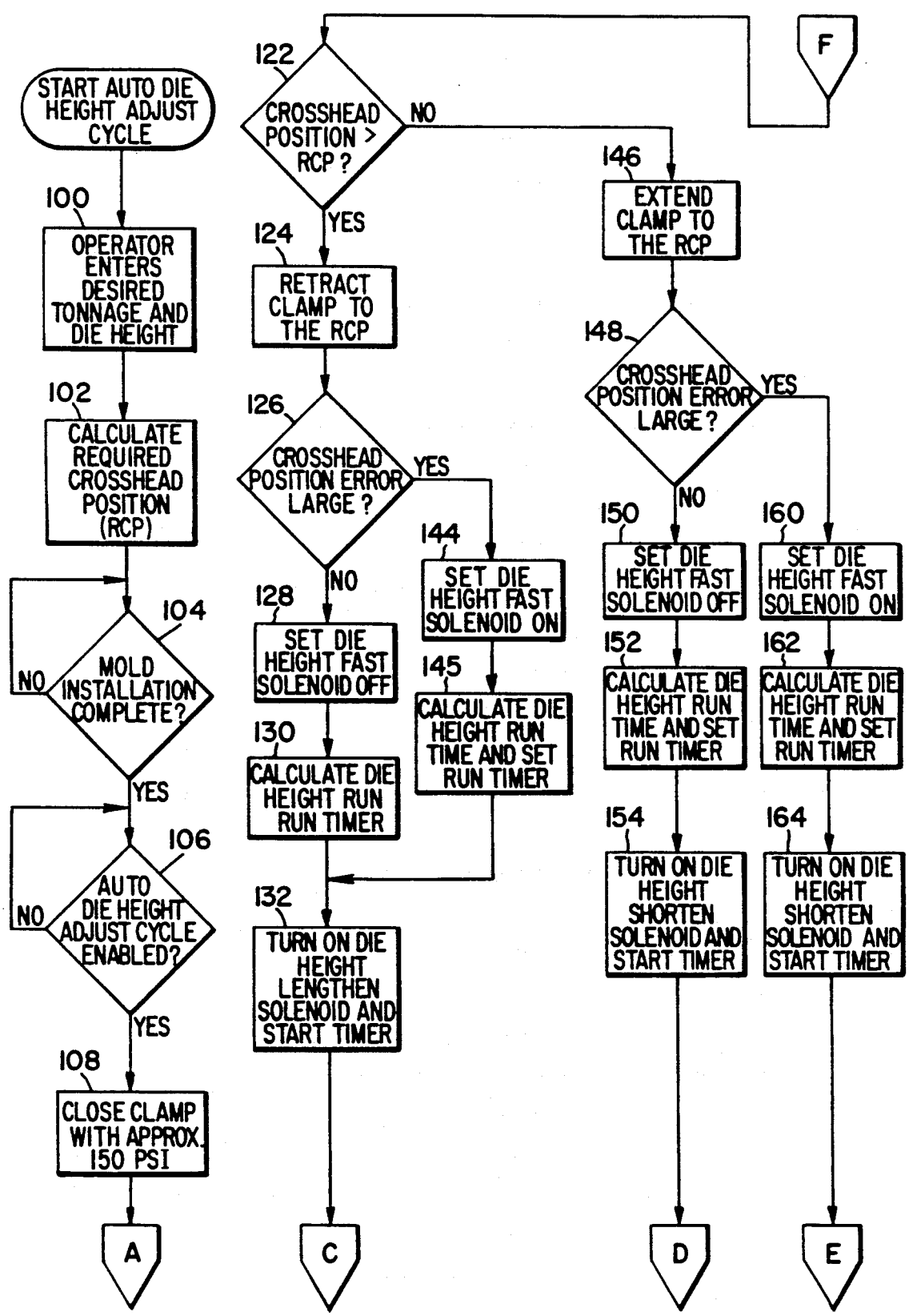
FIGS. 8A and 8B are flow charts showing the several steps that are followed in connection with carrying out the control steps for controlling the clamping mechanism in accordance with the present invention.

Referring now to the drawings, and particularly to FIGS. 1 and 2 thereof, there is shown an injection molding machine 10 that includes an injection system 12, a mold section 14, and a mold clamping system 16. The injection system is not illustrated in detail, and the structure and operation of the injection system can be any of a number of types that are well known to those skilled in the art.

Mold section 14 includes a stationary mold platen 18 that is secured to a suitable machine base 20, and it also includes a movable mold platen 22 that is slidably supported for movement along four parallel guide rods 24 that extend outwardly from stationary mold platen 18 toward clamping system 16. Stationary mold platen 18 carries a stationary mold half 26 and movable mold platen 22 carries a movable mold half 28 that is cooperable with stationary mold half 26 to define one or more mold cavities 30 that receive molten plastic material that is heated and softened in injection system 12 and is then injected into mold cavity 30 to form a molded part. In FIG. 1 mold halves 26 and 28 are shown in contacting relationship while in FIG. 2 the mold halves are shown spaced from each other along guide rods 24.

As also shown in FIGS. 1 and 2 of the drawings, movable mold platen 22 can carry a part ejector 32, which can be of a known structure and can include an hydraulic cylinder and ejector pins (not shown) to eject the completed molded parts from movable mold half 28 after the molding operation has been completed and the molds have been separated from each other.

Clamping system 16 is adapted to move movable mold platen 22 toward and away from stationary mold platen 18 and to hold mold halves 26 and 28 tightly together during the time molten plastic material is injected into the mold cavity and also during subsequent cooling of the molded part. As shown, clamping section 16 includes a clamp support platen 34 that is spaced from movable mold platen 22 along the longitudinal axis of the machine. Clamp support platen 34 is supported on base 20 of the machine, and it is slidable therealong on ways or wear plates 36. Guide rods 24 that extend from stationary mold platen 18 extend through suitable openings formed in clamp support platen 34 so that threaded ends 38 of guide rods 24 can be threadedly connected with respective nuts 40 that are rotatably carried on the rear face of clamp support platen 34.

The connection between the respective clamp platen nuts 40 and guide rods 24 is shown in greater detail in FIG. 6, in which nuts 40 are rotatably supported in annular collars 42 that are bolted to the rear face of clamp support platen 34 to retain nuts 40 in an axial position relative to guide rods 24, but to permit rotation of the nuts relative to the clamp support platen.

Extending between clamp support platen 34 and movable mold platen 22 is a toggle-type clamping system 16 that extends between pairs of upper and lower clamp support platen yokes 44 and corresponding pairs of upper and lower movable mold platen yokes 46 that are longitudinally spaced from clamp support platen yokes 44 in the direction of the longitudinal axis of the machine. Clamping system 16 includes first links 47 that extend from clamp support platen yokes 44 and that are pivotally connected therewith through respective pivot pins 48. The other ends of first links 47 are pivotally connected with respective second links 50 through pivot pins 52, and second links 50 are, in turn, pivotally connected through pivot pins 54 with movable platen yokes 46. As shown in FIGS. 1 and 2, clamping system 16 is in the form of a double toggle arrangement, including both an upper toggle linkage and a lower toggle linkage, with each toggle linkage being the mirror image of the other, relative to the machine longitudinal axis.

Extending inwardly toward the machine longitudinal axis from respective pivot pins 52 when the toggle links are extended as shown in FIG. 1 are respective crosshead links 56 that are pivotally connected with a toggle crosshead 58 through pivot pins 60. Crosshead 58 is movable toward and away from clamp support platen 34 by means of a crosshead hydraulic cylinder 62, the outer end of rod portion 64 of which is connected with crosshead 58. Additionally, crosshead 58 is guided for movement along four parallel crosshead support rods 66 that are secured to and extend outwardly from clamp support platen 34 and that terminate in respective guide rod support members 68. Actuation of toggle crosshead 58 consequently actuates respective toggle links 47, 50, and 56 to cause movable mold platen 22 to be moved toward and away from stationary mold platen 18.

Because clamp support platen 34 can be shifted along the longitudinal axis of the machine to a desired position, it is sometimes referred to as a "die-height platen" because it can be positioned so as to accommodate molds having different dimensions in the machine longitudinal direction, and thus can be used to vary the "die height," which is the spacing between the stationary and movable platens when the clamping system has been moved to its fully extended position. Thus, if molds having a shallower depth, as viewed in the direction of the machine longitudinal axis, are installed in the machine, it is necessary to adjust the clamping system by shifting the position of clamp support platen 34 toward stationary mold platen 18 so that movement of movable mold platen 22 toward stationary mold platen 18 causes the mold halves to contact each other when the clamping system is in its fully extended position. That adjustment is made by shifting the clamp support platen, or die height platen, toward the right, as viewed in FIGS. 1 through 4, as necessary to provide the desired mold contact upon full extension of the clamping system. Such movement of clamp support platen 34 is effected by turning the respective adjusting nuts 40 in the proper direction to provide the necessary shift in position of clamp support platen 34.

The structure for effecting movement of clamp support platen 34 in a direction along the longitudinal axis of the machine includes an hydraulic motor 70 that is secured to the rear face of clamp support platen 34, as shown in FIG. 3. As shown in FIG. 5, motor 70 carries and drives a driving sprocket 72, which, in turn, drives a chain 74 (see FIG. 3) that passes around driving sprocket 72 and also around respective driven sprockets 76, each of which, as shown in FIG. 6, is carried by one of adjusting nuts 40. Chain 74 passes around sprockets 72 and 76 that are shown in enlarged form in FIGS. 5 and 6, respectively.

Also attached to clamp support platen 34 is a displacement sensor 78, which can be in the form of a linear potentiometer that includes a rod portion 80 connected with crosshead 58 (see FIGS. 1 and 7). Displacement sensor 78 is provided to monitor the position of crosshead 58 relative to clamp support platen 34, as will be hereinafter explained in greater detail.

In the usual operation of such a machine, it is necessary either to initially install a set of molds or to later replace one set of molds with another set. The mold installation process is relatively standard and involves as the first step assuring that the die height platen 34 is so positioned relative to stationary mold platen 18 that mold platens 18 and 22 are separated by a distance sufficient to permit the molds to be positioned therebetween when the links of the toggle mechanism are fully extended.

Using a crane or other support means, the molds are positioned between platens 18 and 22. With the toggle links fully extended, die height motor 70 is then operated to cause platen 22 to move toward platen 18. The molds are then aligned with each other and with the mold platens, and by means of the die height motor, the molds are brought together until the motor stalls out. The molds may then be secured to the mold platens. Completion of the mold installation process may also require setting up part ejectors and any cores. The desired cycle speeds, clamp positions, and a desired mold clamping force are established.

In order to achieve the desired mold clamping force when the toggle links are fully extended, it is necessary that the molds contact each other at a point before full toggle link extension has occurred, so that additional toggle link movement toward full link extension causes the clamping mechanism to impose the desired clamping force or tonnage when full link extension is achieved. The subsequent extension of the toggle mechanism from the initial mold touch position to full extension of the toggle links will result in a compressive force acting on the molds to correspond with the desired clamping force or tonnage. The desired clamping force that is selected will depend upon the size and complexity of the part to be molded, the molding material being used, and the pressure at which the molding material is injected into the mold cavity when the molds are in contact with each other.

Typically during the usually manually performed die height adjustment procedure, the machine operator will have to make several die height platen position adjustments on a trial and error basis until the correct die height platen position point is found that provides sufficient mold clamping force upon full toggle link extension. That clamping force is usually the maximum force attainable. However, the present invention permits that tedious and often time-consuming adjustment operation to be performed automatically.

After the mold installation is complete, the clamp is opened, the control auto-cycle is selected, and the automatic die height adjust cycle in accordance with the present invention is initiated.

Figure 8B:
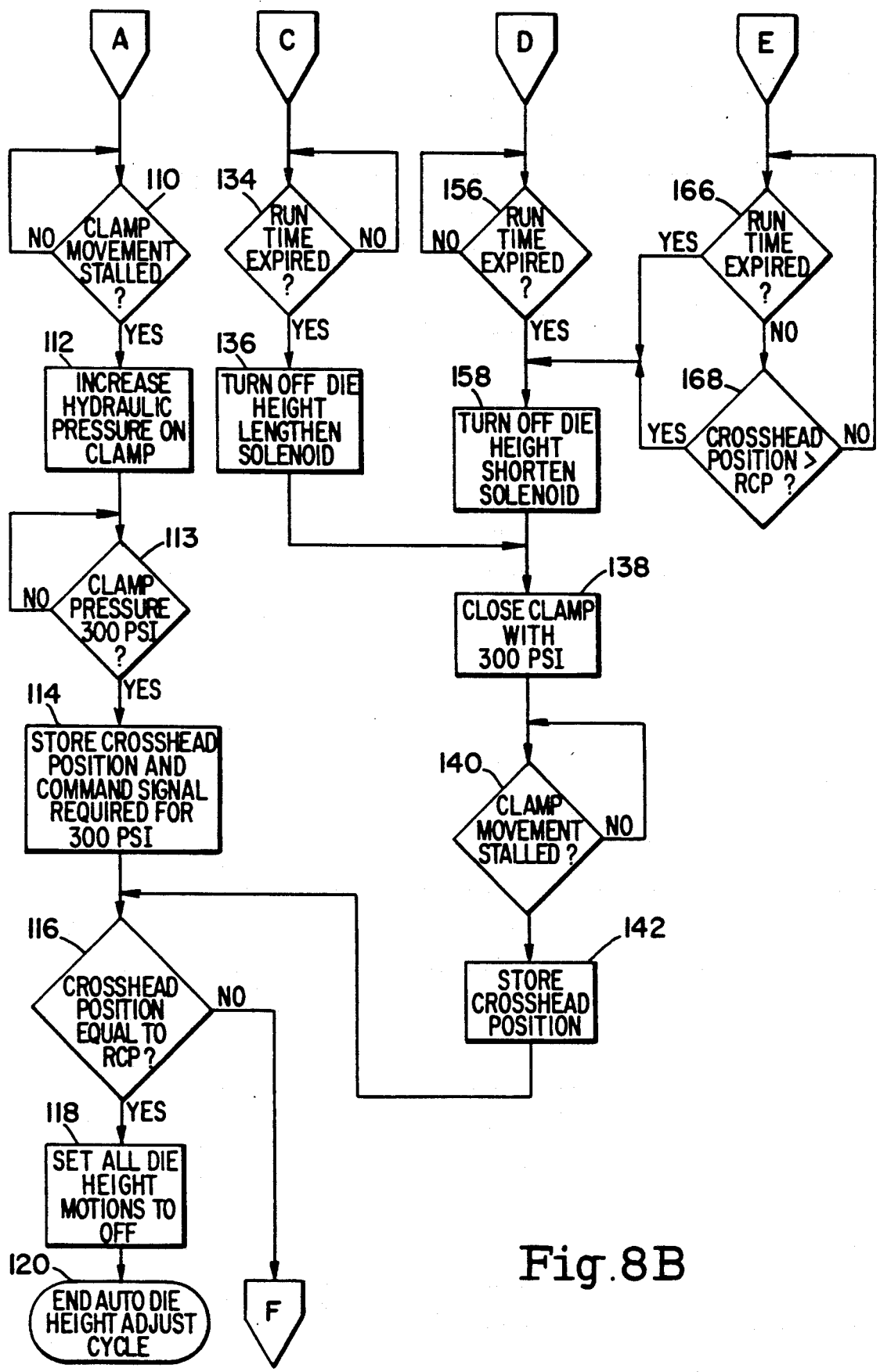

As shown in flowchart form in FIGS. 8A and 8B, the first step 100 of the adjustment sequence for automatically setting the operating die height platen position requires that the operator enter into a control device the desired clamping force, sometimes referred to herein as "tonnage," and the mold or die height for the particular molds that have been installed. The mold height is the space occupied by the molds when they are in contact with each other, which is the spacing between movable platen 22 and stationary platen 18 when the molds are closed, and it is measured in the direction of the machine longitudinal axis.

The control device has been suitably programmed to carry out the several steps and operations as described herein, and in step 102 it determines a "required crosshead position" (RCP) based upon the desired tonnage. The RCP is defined as the position of the toggle crosshead 58 relative to the die height platen 34 at which the molds must come into contact in order to achieve the desired tonnage when the toggle links are fully extended.

Figure 9:
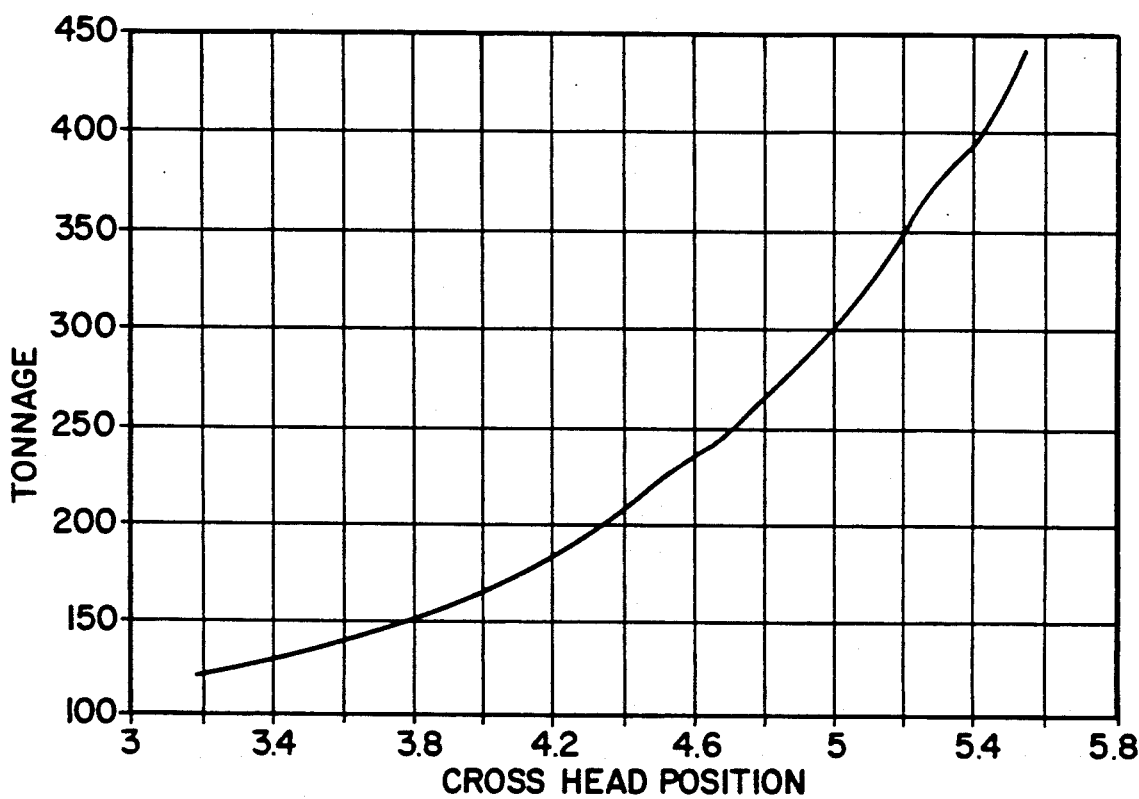
FIG. 9 is a curve of mold clamp tonnage versus toggle crosshead position.

The RCP may be determined from a curve of clamp tonnage versus crosshead position, which has been previously determined experimentally for a particular size machine having a particular maximum clamp operating tonnage. An example of such a curve is shown in FIG. 9, in which the required crosshead position relative to die height platen 34 is shown for any desired clamp tonnage for a specific toggle-type machine having a clamping capacity of 440 tons. The points defining the curve can be stored in a memory within the control device. Alternatively, because the upper part of the curve, representing the upper half of the clamp tonnage range, is approximately linear, two predetermined points on the curve, e.g., a point corresponding with the maximum clamping force and a point corresponding with fifty percent of the maximum clamping force, can be entered into the control device to define a straight line function for determining crosshead position based upon desired tonnage within that range of tonnage. Therefore, for any desired tonnage in the upper half of the tonnage range, the control device will be able to determine the required crosshead position based upon the linear relationship defined by the two predetermined points.

Because the magnitude of the clamping force imposed on the molds is a function of the extent to which the guide rods 24 are stretched from their initial unstressed length during the clamping operation, the above relationship relating tonnage or clamping force to crosshead position or RCP, will change with the effective length of the platen guide rods. The effective length of the guide rods is a function of the mold height, which, as earlier noted, is the distance between the opposed faces of movable platen 18 and stationary platen 22 when the molds are closed. Consequently, the effective length of the guide rods must also be taken into consideration when determining the RCP.

If the previously defined points interrelating tonnage with crosshead position are determined at the maximum mold height, the die height platen can then be moved to the position corresponding with the minimum mold height, and the crosshead position corresponding with the maximum tonnage under that condition can also be determined and stored in the memory of the control device. Therefore, the variation in crosshead position to achieve maximum tonnage between the minimum mold height and the maximum mold height can be determined. Given the actual mold height that is entered into the control device, the control device can determine the proportion of the actual mold height to the total mold height variation from maximum to minimum, and then apply that proportion to the variation in crosshead position caused by the total variation in mold height. That correction in crosshead position is added to the crosshead position determined to be required at the minimum mold height and the sum is the RCP.

In step 104, a determination is made whether the mold installation process is complete. That means, among other things, that the clamp has been opened and the control put in the auto-cycle mode, which will allow the iterative clamp operation required by the die height platen position adjustment process. After the RCP is determined, the operator can as the next step 106 enable the automatic die height adjustment cycle that forms a part of the present invention. Although shown as an operator input, the device could be programmed to enable that step to be performed automatically, if desired. Additionally, the control system in accordance with the present invention can also be arranged to monitor crosshead position continuously, or periodically after a predetermined number of operating cycles, to maintain the desired clamping force.

The automatic die height adjustment cycle involves closing the clamp in step 108 by activating an hydraulic pump (not shown) to supply hydraulic fluid under low pressure, e.g., 150 psi, to the toggle cylinder. As a result, the toggle crosshead will be moved toward the right, as viewed in FIG. 2, until the molds touch or until the clamp toggle is moved to its fully extended position. As detected in step 110, once the clamp has stopped moving, which can be determined by monitoring position sensor 78, the hydraulic pressure in the toggle cylinder is increased in step 112 to an arbitrary pressure, e.g., 300 psi, as detected in step 113. The hydraulic pump output that is required to achieve that pressure level is recorded and stored in the control device for subsequent use. With the clamp parts in that position, the initial crosshead position is also stored in the memory in step 114.

If the actual crosshead position as indicated by the toggle crosshead displacement sensor is determined in step 116 to be substantially equal to the required crosshead position (RCP), the adjustment elements of the machine are turned off in step 118, and the adjustment sequence is ended in step 120. However, if the actual crosshead position is determined in step 122 to be greater than the RCP, which indicates a condition under which the die height platen is too close to the stationary platen, resulting in too high a clamping force or tonnage between the molds, the clamp is then retracted in step 124 so that the crosshead moves to the RCP. At that point a determination is made in step 126 as to whether the difference between the stored crosshead position and the RCP is large, i.e., greater than a particular value. If it is not, then steps 128 through 134 are executed, and the die height motor is activated at slow speed for a time proportional to the position difference between the stored crosshead position and the RCP. Once the die height platen has been shifted, step 136 is executed, the die height motor is stopped, and the clamp is closed at 300 psi using the hydraulic pump output that was previously determined, and steps 138 through 142 are executed. If the new stored crosshead position is then within a predetermined tolerance of the RCP, as determined in step 116, the adjustment sequence is terminated. If it is not, then the adjustment sequence is repeated until the required crosshead position is achieved.

Returning to step 126, if the crosshead position is incorrect by greater than a predetermined amount, the die height platen is adjusted more rapidly by operating the die height motor at a faster speed and for a longer period of time in steps 144 and 145, in order to more quickly bring the die height platen into the required position.

In the event the stored crosshead position is less than the required crosshead position, which would occur when the die height platen is too far away from the stationary mold platen, resulting in too low a clamping tonnage, a similar adjustment sequence is followed, as shown in steps 146 through 168 in FIGS. 8A and 8B. Again, both slow and fast die height motor speeds are employed, depending upon the difference between the stored crosshead position and the required crosshead position.

Figure 10:
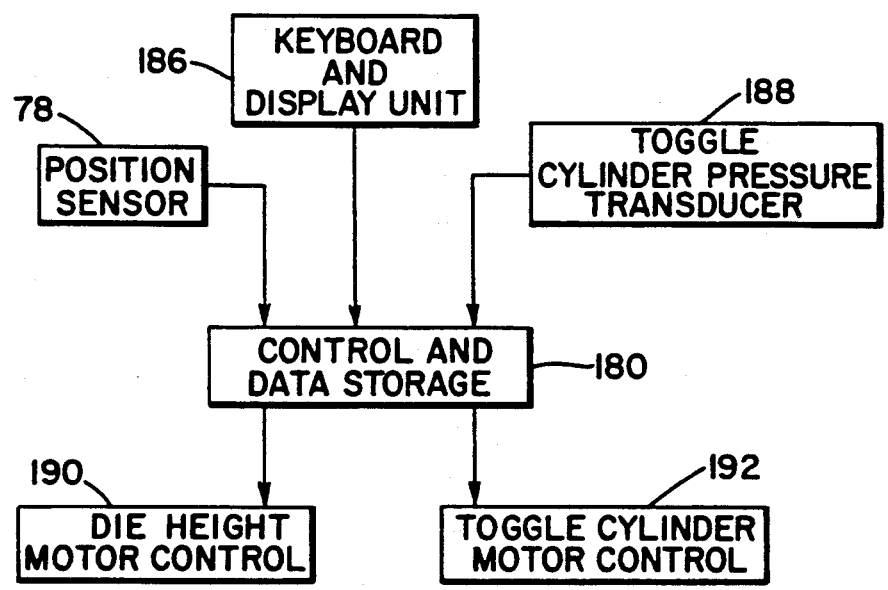
FIG. 10 is a block diagram showing the interconnections of the control elements and the input parameters.

The control elements for performing the adjustment sequence steps shown in FIGS. 8A and 8B are illustrated in block diagram form in FIG. 10. Control 180 may be a typical injection molding machine control which preferably has arithmetic and logic processing capability, along with memory or data storage means. An example of such a control is the CAMAC XTL control manufactured by Cincinnati Milacron Inc. One skilled in that art may use the CAMAC XTL or another injection molding machine control with arithmetic and logic processing to implement the process illustrated in FIGS. 8A and 8B without undue experimentation. The data relating to clamp tonnage as a function of crosshead position can be initially determined at the factory by using the keyboard and display unit 186 to command the die height motor control 190 to move the die height to maximum and minimum positions. The keyboard and display unit 186 may be used to command tonnage limits as measured by the toggle cylinder pressure transducer 188, and the required crosshead positions are measured by the position sensor 78 and stored in the control.

In executing the die height adjust cycle, the desired clamping force and the mold height are entered by the operator through the keyboard and display unit 186. The outputs from the control 180 include a signal to operate the die height motor control 190 and the toggle cylinder motor control 192 that controls the application of hydraulic fluid under pressure to the toggle cylinder.

It can thus be seen that the present invention provides an arrangement for automatically setting the die height in a toggle-type injection molding machine, based upon the sizes of the molds that are used, and also based upon an operator-selected clamping tonnage.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A method for setting a predetermined clamping force between a first mold member on a stationary platen and a second mold member on a movable platen connected to a toggle clamping mechanism carried by a die height platen for movement of the movable platen and second mold member toward and away from the first mold member, the positions of both the movable platen and the toggle clamping mechanism being adjustable relative to the stationary platen, said toggle clamping mechanism being operable to selectively move the movable platen to any position relative to the stationary platen between a first extreme position at which the toggle clamping mechanism is retracted and the mold members are spaced from each other and a second extreme position at which the toggle clamping mechanism is fully extended and the mold members are in contact with each other, the method comprising the steps of:
   a. defining a required clamp position of the toggle clamping mechanism relative to the die height platen, at which clamp position the mold members are in contact and are held together at the predetermined clamping force when the toggle clamping mechanism is in the second extreme position;
   b. actuating the toggle clamping mechanism to move the movable platen toward the stationary platen;
   c. detecting a first intermediate toggle clamping mechanism position in response to cessation of movement of the movable platen toward the stationary platen;
   d. determining the difference between the required clamp position and the detected first intermediate toggle clamping mechanism position;
   e. actuating the toggle clamping mechanism to move the movable platen away from the stationary platen; and
   f. adjusting the position of the die height platen relative to the stationary platen such that the difference between the required clamp position and the detected first intermediate toggle clamping mechanism position approaches a zero value so that the predetermined clamping force will be produced on the molds when the toggle clamping mechanism is moved to the second extreme position.

2. The method of claim 1 wherein the toggle clamp mechanism further includes actuator means for selectively applying a first force to the toggle clamping mechanism to move the movable platen away from the stationary platen and a clamping force to move the movable platen toward the stationary platen, and after the step of detecting a first intermediate toggle clamping mechanism position, the method further comprises the step of applying to the toggle clamping mechanism a first clamping force that is greater than zero but substantially less than the predetermined clamping force.

3. The method of claim 1 wherein the method further comprises the step of iterating steps (b) through (f) until the difference between the required clamp position and the first intermediate toggle clamping mechanism position is less than a predetermined minimum value.

4. The method of claim 1 wherein the method further comprises the step of iterating steps (b) through (f) at selectable times to maintain the difference between the required clamp position and the first intermediate toggle clamping mechanism position approximately equal to zero.

5. A method in accordance with claim 1, including the following additional step:
   g. shifting the position of the toggle clamping mechanism at a first speed when the difference between the required clamp position and the detected first intermediate toggle clamping mechanism position is equal to or less than a predetermined difference and shifting the position of the toggle clamping mechanism at a second speed when the difference is greater than the predetermined difference.

6. A method in accordance with claim 5, wherein the second speed is greater than twice the first speed.

7. A method for controlling the operation of a molding machine connected to a control means to set a predetermined clamping force between a first mold member affixed to a stationary platen and a second mold member affixed to a movable platen connected to a clamping mechanism and movable toward and away from the first mold member, the clamping mechanism being connected to means for adjusting the position of the clamping mechanism and movable platen relative to the stationary platen and further having position sensing means for producing a feedback signal representing the position of the movable platen relative to the clamping mechanism, the clamping mechanism including actuator means for selectively applying a force to the clamping mechanism to move the movable platen to any position relative to the stationary platen between an open position to open the molds and a closed position to close the molds with a clamping force applied to the molds, the control means having data entry and storage means and being connected with the position sensing means, the clamping mechanism adjusting means, and the actuator means, the control operative to execute a method of comprising the steps of:

a. storing reference signals defining desired clamping forces to be applied by the clamping mechanism with the clamping mechanism in the closed position;

b. producing in response to one of the reference signals a required position signal representing a position of the movable platen at which the molds come into contact whereby the predetermined clamping force is produced in response to the clamping mechanism being in the closed position;

c. producing a first signal to the actuator means to cause the actuator means to apply a first force to the clamping mechanism to move the movable platen toward the stationary platen;

d. detecting in response to the feedback signal the absence of motion of the movable platen in response to the first signal;

e. in response to detecting the absence of motion of the movable platen, storing a first position signal from the position sensing means representing a first position of the movable platen;

f. comparing the required position signal with the first position signal to produce a difference signal;

g. producing a second signal to the actuator means to cause the actuator means to apply a second force to the clamping mechanism to move the movable platen away from the stationary platen;

h. producing a third signal to the adjusting means to adjust the position of the toggle clamping mechanism and the movable platen relative to the stationary platen in a direction to the effect a reduction in the difference signal; and i. iterating steps c. through h. until the difference signal is equal to a predetermined minimum value so that the predetermined clamping force will be produced when the clamping mechanism is subsequently moved to the closed position.

8. The method of claim 7 wherein the step of producing a required position signal comprises the steps of:

a. storing a further reference signal representing a mold height distance corresponding with the distance between the movable platen and the stationary platen with the mold members in contacting relationship; and b. producing in response to the one of the reference signals and the further reference signal, a required position signal representing the position at which the molds come into contact to produce the predetermined clamping force in response to the clamping mechanism being in the closed position.

9. The method of claim 7 wherein after the step of detecting the absence of motion of the movable platen the method further comprises the step of producing a fourth signal to the actuator means to cause the actuator means to apply a reference force to the clamping mechanism in the absence of motion of the movable platen.

* * * * *